Aug. 18, 1931.  W. G. WOOD  1,819,725
LIGHT PROJECTING REFLECTOR
Original Filed April 5, 1926  4 Sheets-Sheet 1
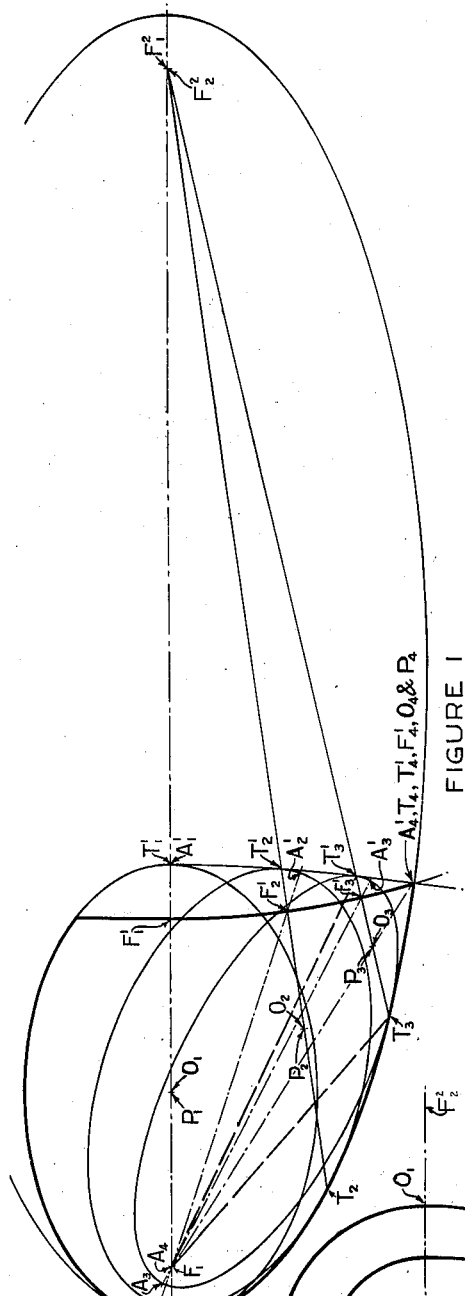
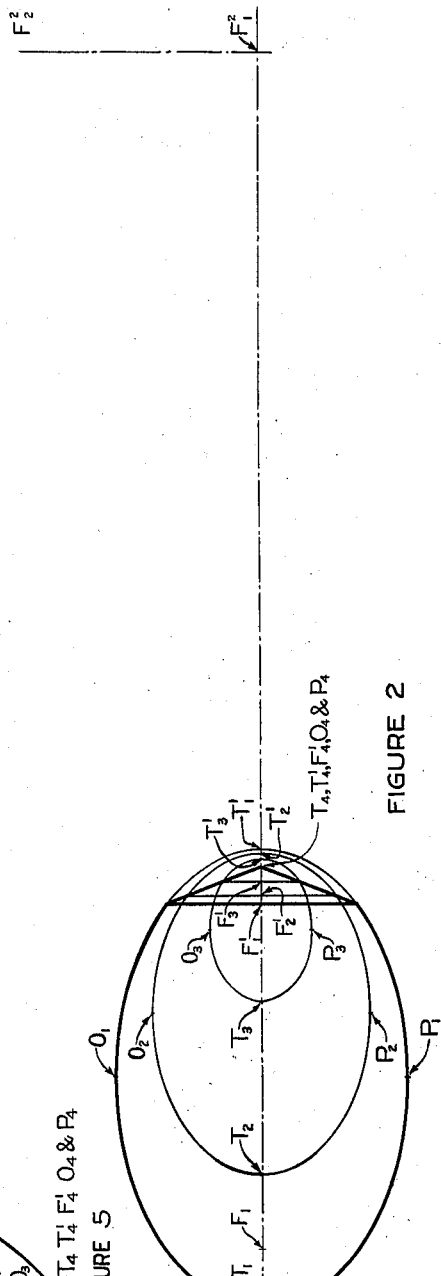
WILLIAM G. WOOD INVENTOR.
BY
ATTORNEYS.

Aug. 18, 1931.  W. G. WOOD  1,819,725
LIGHT PROJECTING REFLECTOR
Original Filed April 5, 1926   4 Sheets-Sheet 3

WILLIAM G. WOOD INVENTOR.

BY
*Townsend, Loftus & Abbett*
ATTORNEYS.

Aug. 18, 1931.  W. G. WOOD  1,819,725
LIGHT PROJECTING REFLECTOR
Original Filed April 5, 1926  4 Sheets-Sheet 4

WILLIAM G. WOOD INVENTOR.

BY
ATTORNEYS.

Patented Aug. 18, 1931

1,819,725

UNITED STATES PATENT OFFICE

WILLIAM G. WOOD, OF SAN FRANCISCO, CALIFORNIA, ASSIGNOR TO AMERICAN WOODLITE CORPORATION, OF SAN FRANCISCO, CALIFORNIA, A CORPORATION OF CALIFORNIA

LIGHT PROJECTING REFLECTOR

Application filed April 5, 1926, Serial No. 99,684. Renewed July 21, 1930.

This invention relates to projectors for light and other radiant energy, and involves a novel method of generating a reflecting surface which will distribute light rays in such manner as to obtain maximum efficiency in general lighting with a minimum of current consumption, and will also produce a beam ideally suited for illuminating a roadway; and also a novel form of device resulting from said method.

In my co-pending application, Serial Number 682,650, filed December 26, 1923, I set forth in considerable detail what has generally been agreed is the ideal distribution of light for a light projector to be used on automobiles, and then proceeded to show the construction of a reflecting surface that would give this result. This construction involved the use of a hemi-ellipsoid of revolution above the principal horizontal plane through the projector, and below that a surface of rather intricate curvature, which was the locus of consecutive elements of a family of paraboloids of revolution with consecutive elements of a family of ellipsoids of revolution, in which the light source was located at a point which was the focus common to all paraboloids and also the proximate focus common to all ellipsoids. In other words, the lower portion of the reflector, which, primarily, was responsible for the production of the novel form of beam, was formed of a series of parallel, horizontal, diminishing ellipses, from top to bottom, while a pencil of vertical planes with axis coincident with the remote foci of the horizontal ellipses formed vertical parabolic arcs throughout on intersection with the reflector, or with the parallel diminishing ellipses.

It was intended that the above construction would give the results desired; that is, a field of two distinct intensities, flat on top, with a spread of approximately 180 degrees, the secondary lighting intensity lighting the foreground and sides, and the primary beam of high intensity, for distant projection, being distributed along the top of the secondary field. This construction gave good results in headlights, except in one particular: the beam produced by the lower reflector (the beam of high intensity) had too great depth; in other words, its vertical angle of spread was too great. Thus where I intended this beam, normally horizontal, to be projected several hundred feet ahead before its vertical spread would cause it to be intercepted by the road, I found in actual construction that it was intercepted by the roadway too close to the car.

The reason for the above difficulty can be explained as follows:

The horizontal diminishing ellipses crossed the rays on the line of remote foci, as was desired, but the vertical parabolic contour did not project this beam with rays in parallelism, as was desired, and which in theory it should do. This was due to the well known difficulty in relation to the paraboloid reflector; the paraboloid reflector in theory will project its rays in parallelism, but to do this it is necessary to presuppose a point light source. A point light source is, unfortunately, impossible to obtain; the finely concentrated filament of the Mazda C lamp has size—too much size; hence, the beam projected by the paraboloid reflector is quite widely divergent and is conical instead of cylindrical. It is, then, quite apparent why the beam above described had too much depth, or vertical spread. Consideration of this problem has led to the discovery of a method of getting various effects in light distribution.

In the present application I describe a combination of conic sections which I have found will give the ideal results desired in a headlight. In the generation of this reflector every conic section is involved; whereas in my case above discussed only two are used, parabolas and ellipses. But the principal change has been the substitution of elliptical arcs for the vertical parabolic arcs, the remote vertices of these ellipses being disposed on a hyperbolic arc on the main horizontal plane, the axis of which is coincident with the longitudinal axis of the reflector and exterior of the reflector or generated surface itself. The former diminishing parallel horizontal ellipses are now no longer parallel or horizontal in this new construction, but lie on planes converging to a remote transverse line which intersects the longitudinal axis of the reflector at the remote focus of the vertical elliptical arc on the median vertical plane. Said transverse line can be disposed 35 feet distant from the reflector, or more or less, to give the results desired.

In theory, the construction described above would focus the rays of light on this transverse line, just as in theory a paraboloid reflector projects its rays in parallelism, giving a beam cylindrical in form. But in practice neither result is obtained; the paraboloid reflector, as already stated, gives a divergent beam, conical in shape; and in my construction herein described, with vertical elliptical arcs, and with the exterior transverse line of intersecting converging planes well in the distance, the rays are projected in substantial parallelism vertically, thus reducing the depth, or vertical spread of the beam, as produced in my prior type. It is conceded that if the position of the exterior transverse line be placed but a short distance outside of the generated reflecting surface (say a few inches), then the projected rays can be focused quite accurately on this line.

Briefly, the method involves the generation of a reflecting surface from a series of ellipses diminishing from top to bottom, all having the light source at a common focal point for their proximate foci and the remote foci of said ellipses being located on a line in a vertical plane, which may be straight or curved. The said ellipses are arranged with their proximate vertices following an arc of a parabola, ellipse, or hyperbola. If said ellipses be parallel and have their proximate vertices following the arc of a parabola, then their remote foci will fall on a straight, vertical line, and the rays projected, theoretically, will cross on said straight line and continue out in parallelism on vertical planes. If said ellipses are made to converge towards a point forwardly of the light source, and their proximate vertices are arranged on an arc of an ellipse, then the remote foci of the said ellipses will fall on an arc of a circle which is convex when viewed from the light source, and the rays projected will converge to a distant point in front of the reflector. If said diminishing ellipses are made to diverge from a point in the rear of the light source, and the proximate vertices are arranged on the arc of a hyperbola, then the remote foci will fall on an arc of a circle which is concave when viewed from the light source, and the beam projected will consist of rays diverging in vertical planes. In each instance the said ellipses are cut away adjacent the remote foci, thus leaving a narrow aperture for the emergence of the reflected rays from the reflector, within which aperture said rays cross and diverge laterally at a wide angle, which may be as great as 180 degrees.

The following description and drawings will illustrate the details of my invention:

Fig. 1 shows a vertical central longitudinal section through the reflecting surface, for the purpose of describing one method of its generation.

Fig. 2 is a plan view, showing typical sections of the reflector as cut by converging planes.

Fig. 5 shows a front elevation of the reflector.

Figure 3:
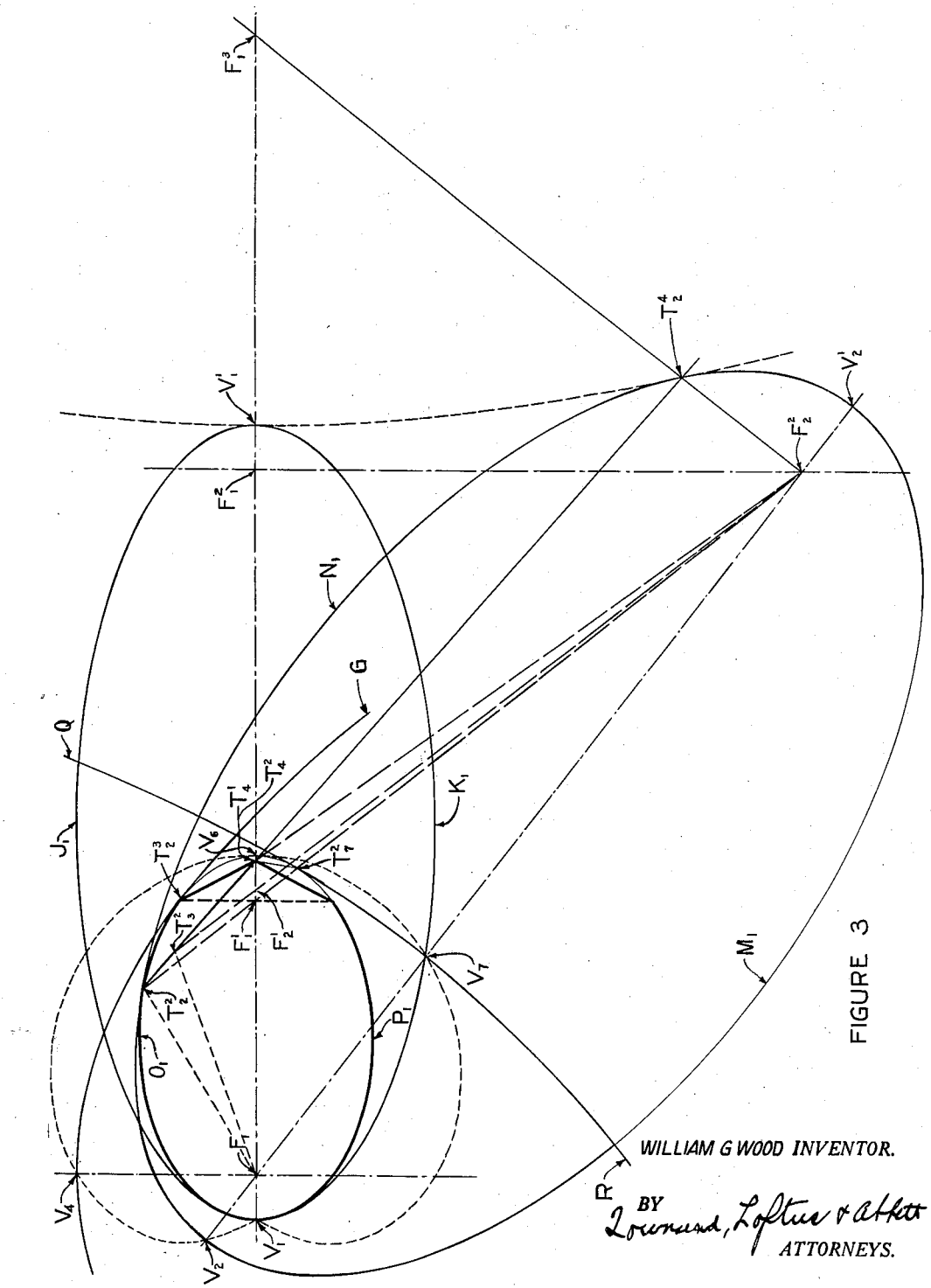
Fig. 3 is a plan view showing another method of generating the reflecting surface by revolving quadric surfaces of revolution.
Figure 4:
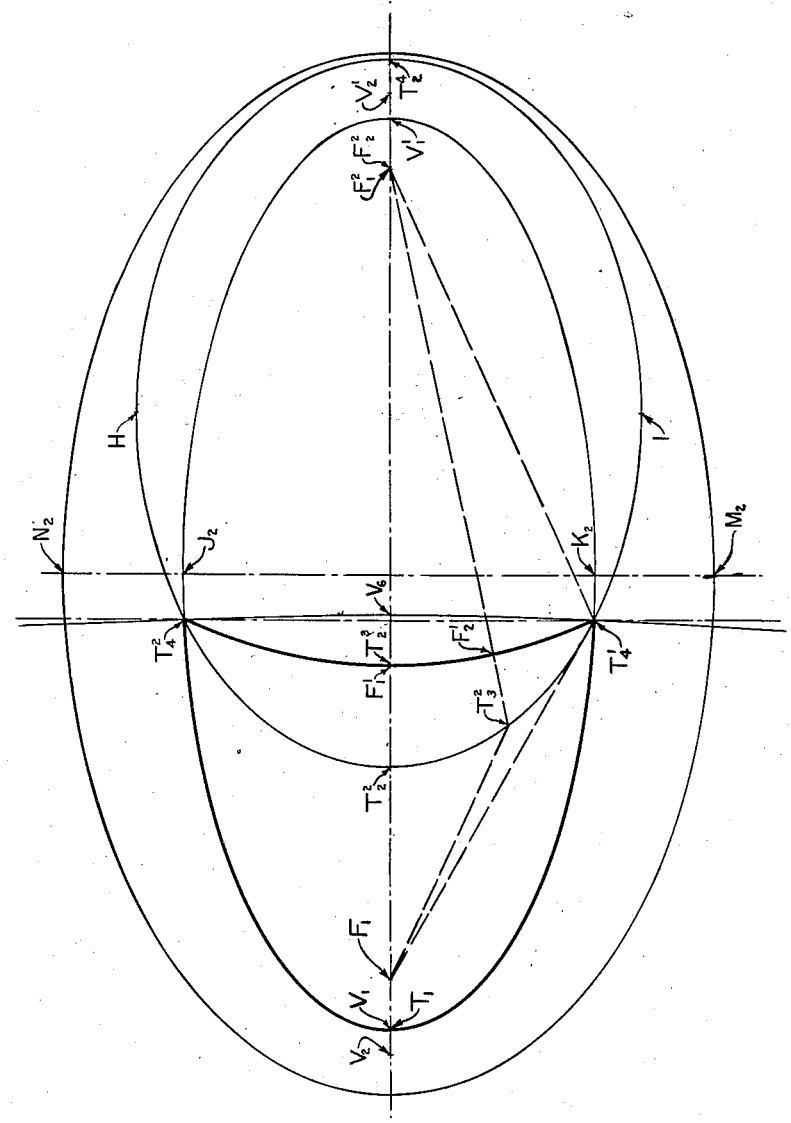
Fig. 4 is the projection of Fig. 3 on the median vertical plane.
Figure 7:
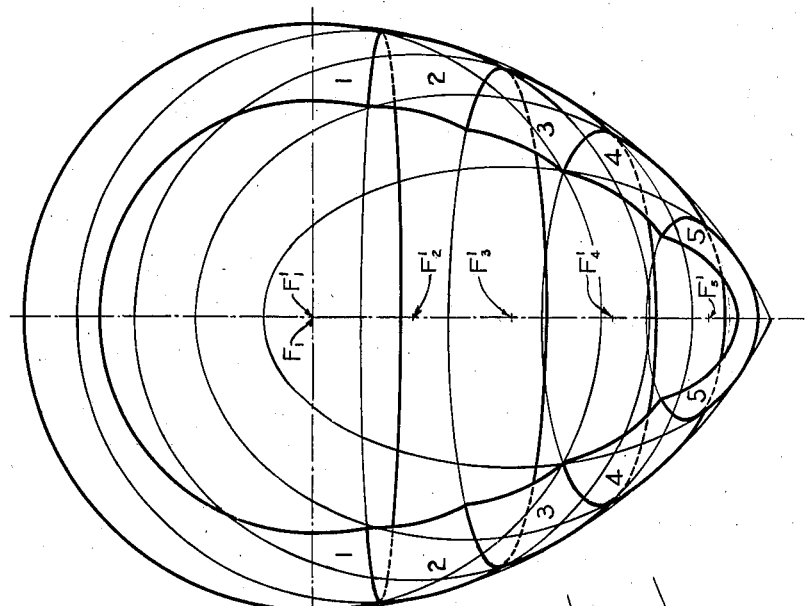
Fig. 7 is a front elevation of Fig. 6.
Figure 6:
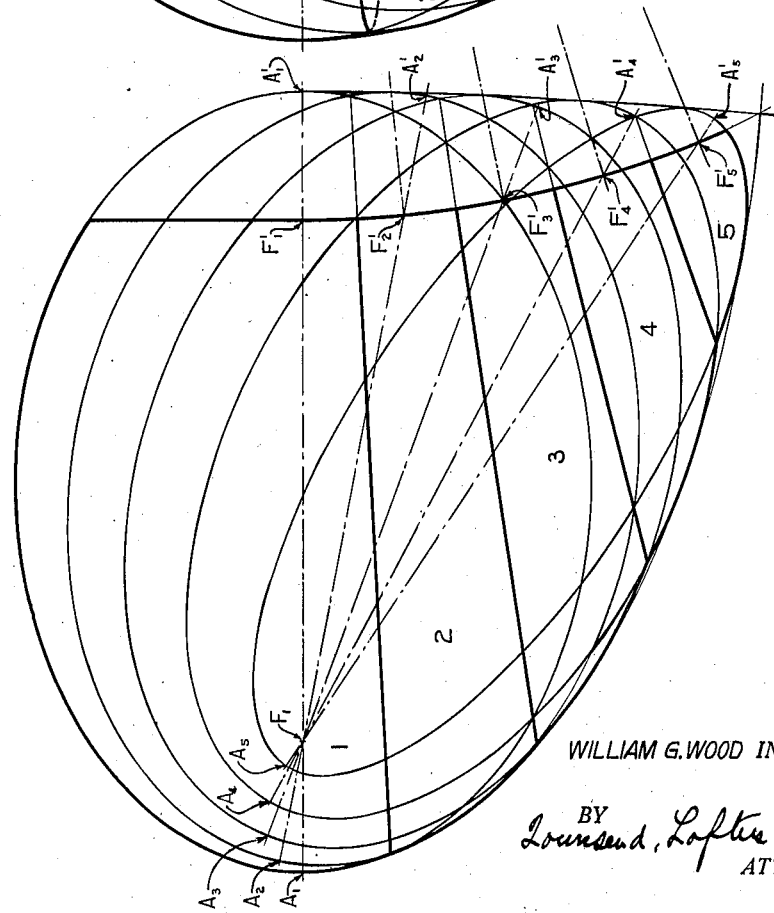
Fig. 6 is a vertical projection on median plane of a reflector formed by a third method of generating consisting of finite sections of separate ellipsoids.

Figs. 1, 2 and 5 show the lower reflector as being the outer envelope of a series of diminishing ellipsoids of revolution, while Figs. 3 and 4 show the same reflecting surface defined as the inner envelope of a series of increasing quadric surfaces of revolution. Figs. 6 and 7 show the lower reflecting surface as a combination of portions of simple ellipsoids of revolutions having similar properties to the reflectors illustrated in Figs. 1 to 5 inclusive.

Referring to the accompanying drawings:

Fig. 1 shows the manner in which the reflector is generated by ellipses cut from a family of consecutive ellipsoids of revolution by corresponding members of a fixed pencil of planes. Said ellipsoids have a common proximate stationary focus, the remote foci lying on the arc of a circle in the median vertical plane, while the major axes have constant length. $F_1$ is the common proximate focus and $F_1^1$ $F_2^1$ $F_3^1$ $F_4^1$ represent varying positions of remote foci on the said circular arc, whose center is at $F_1^2$. $A_1$ $A_1^1$, $A_2$ $A_2^1$, $A_3$ $A_3^1$, $A_4$ $A_4^1$, represent the extremities of the corresponding major axes of the above-mentioned ellipsoids, all being of equal length. With these axes and with foci as shown, ellipsoids are formed by the revolution of ellipses about said axes. Consecutive planes converging to a line shown as $F_1^2$—$F_2^2$ (Fig. 1) and passing through consecutive positions of the remote foci $F_1^1$ $F_2^1$ $F_3^1$ $F_4^1$ form ellipses on intersection with the respective ellipsoids which are shown in Fig. 2 and designated $T_1$ $O_1$ $T_1^1$ $P_1$, $T_2$ $O_2$ $T_2^1$ $P_2$, $T_3$ $O_3$ $T_3^1$ $P_3$, $T_4$ $O_4$ $T_4^1$ $P_4$, the last-named being the point to which the ellipses degenerate. These ellipses as shown are but a few of an infinite number similarly formed and combined to form the surface of the reflector. The light projected from this reflector will be distributed as hereinafter shown.

The fourth ellipsoid having vertices $A_4$ and $A_4^1$ and foci $F_1$ and $F_4^1$ is shown with $A_4$ and $F_1$ coincident and $A_4^1$ and $F_4^1$ as coincident. It is required that $A_4$—$A_4^1$ and $F_1$—$F_4^1$ be coincident and equal, and is the result of considering the minor diameter of the ellipsoid as of zero length. In other words, it is necessary that the inclined ellipsoids degenerate to a line, in order that the reflector diminish in cross section to a point at $F_4^1$ ($A_4^1$). At this point the reflecting surface vanishes but the definition remains fulfilled.

In a given ellipsoid, as, for example, the one shown with foci $F_1$ and $F_3^1$, light emanating at the source $F_1$, will converge to its remote focus at $F_3^1$. If, however, only a narrow zone or band containing the said remote focus is preserved, the reflected rays will lie in said band. By selecting an infinite number of said elliptical bands, each from one member, an infinite number of consecutive ellipses, each containing the remote focus of its respective ellipsoid, and lying respectively on consecutive planes converging to a horizontal transverse line $F_2^2$—$F_1^2$, Figs. 1 and 2, light from a source at the common proximate focus of the ellipsoids will converge along said horizontal transverse line, said rays first crossing on the circular arc $F_1^1$, $F_4^1$, the locus of the remote foci of the ellipsoids.

It is evident that the axes of the horizontal pencil of planes $F_1^2$—$F_2^2$, Figs. 1, 2 and 5 can be placed at any position along the median line through $F_1$ and $F_1^1$, said position determining the curvature of the arc $F_1^1$ $F_4^1$. At points adjacent to and in front of the reflector said arc $F_1^1$ $F_4^1$ will be convex when viewed from $F_1$. Arc $T_1$ $T_4^1$ is then elliptical. When $F_1^2$ is at an infinite distance from $F_1^1$ the arc $F_1^1$ $F_4^1$ becomes a vertical straight line and the arc $T_1$ $T_4^1$ is parabolic. When $F_1^2$ is back of $F_1$—that is, on the opposite side to $F_1^1$—the arc $F_1^1$ $F_4^1$ is concave when viewed from $F_1$ and the arc $T_1$ $T_4^1$ is hyperbolic. In the latter case, obviously, the rays reflected from the surface along $T_1$ $T_4^1$, with source at $F_1$, will diverge forwardly as though originating at the confocal point back of the reflector.

In Fig. 1, points $T_1$ $T_2$ $T_3$ and $T_4$ are positions on the median vertical plane of the proximate vertices of ellipses as formed by members of a pencil of planes intersecting corresponding inclined ellipsoids. These lie on the arc of an ellipse, with foci at $F_1$ and $F_1^2$. Points $T_1^1$ $T_2^1$ $T_3^1$ and $T_4^1$ represent positions of the remote vertices of the same ellipses and lie on the arc of a hyperbola with the same foci $F_1$ and $F_1^2$.

Fig. 3 shows another manner in which this reflector may be generated. By revolving conic sections about their longitudinal axes to generate quadric surfaces of revolution, then revolving these quadric surfaces about a common focus as center, the axes moving in a plane and maintaining their remote foci on a transverse line in the plane, it being required that said surfaces contain a common fixed point outside of the aforesaid plane but adjacent thereto, a limiting internal surface or envelope is generated. Said surface has specific reflecting properties. Since the reflector is composed of single linear elements of consecutive quadric surfaces generated by revolving conic sections about their longitudinal axes, reflected rays from the principal focus common to all said quadric surfaces will converge at the remote focus of the particular quadric from which the element was taken.

Thus, in Fig. 3, $V_2$ $N_1$ $V_2^1$ $M_1$ is an ellipse which, revolving about the axis $V_2$ $V_2^1$, will generate the quadric surface which is here an ellipsoid of revolution, being symmetrical with respect to the median horizontal plane, containing $F_1$ and transverse line $F_1^2$ $F_2^2$. Let $T_4^1$, Figs. 3 and 4, be the external point common to all surfaces of revolution, and let $F_1^1$ $T_4^1$ be the arc of a circle lying on the median vertical plane of the reflected surface with center at $F_1^2$. Each point on said arc $F_1^1$ $T_4^1$ will then be equidistant from any point $F_2^2$ (Fig. 3) on the line $F_2^2$ $F_1^2$, this line being perpendicular to the median vertical plane at $F_1^2$, the center of the arc. Let $F_1$ $T_4^1$ be the line connecting the focus $F_1$ and the fixed point $T_4^1$ through which all quadric surfaces pass. The line will then be common to all ellipsoids. In the median horizontal plane the point $T_2^2$ (Fig. 3) on the ellipsoid $V_2$ $N_1$ $V_2^1$ $M_1$ at the intersection of the line $F_2^2$ $F_1^1$ continued, will have distances from the points, $F_1$ and $F_1^1$, whose sum will equal the aforesaid line, $F_1$ $T_4^1$, a constant. Since $F_2^2$ is any point on the line, $F_2^2$ $F_1^2$, any such point $T_2^2$ will lie on the arc of an ellipse whose foci are $F_1$ and $F_1^1$ and whose major axis is $V_1$ $V_6$, the equivalent of $F_1$ $T_4^1$. Similar points of contact will exist if lines pass from $F_2^2$ through any other point $F_2^1$ on the circular arc $F_1^1$ $T_4^1$ to the ellipsoid, and thence to the focus $F_1$. These points of contact are shown in plan (Fig. 3) and in vertical elevation (Fig. 4) arranged along the line $T_2^2$ $T_4^1$. By taking an infinite number of points on line $F_1^2$ $F_2^2$ for the remote foci of conics of revolution, a surface will be generated by said line of intersection and its section on the median horizontal plane will be the ellipse $V_1 O_1 V_6 P_1$ (Fig. 3) and its section on the median vertical plane will be $V_1 T_4^1 V_6 T_4^2 V_1$, (Fig. 4), $T_4^2$ being the point opposite $T_4^1$ and disposed symmetrically thereto with respect to the horizontal plane through $F_1^2$ and $F_1$.

The proximate vertices of said conics of revolution, revolving about $F_1$ as a center, as herein described, will occupy successive positions along the curve $V_1 V_2 V_4 V_6 V_7 V_1$. The quadric surfaces developed as the remote focus moves outwardly along $F_1^2 F_2^2$ to infinity will be ellipsoids, paraboloids, or hyperboloids, depending on whether the remote foci are inside the surface, at infinity, or outside. Thus, in the quadric surface shown in plan as $V_2 N_1 V_2^1 M_1$, whose proximate vertex is $V_2$, the remote focus $F_2^2$ is inside the figure and the surface is an ellipsoid; the remote focus of the quadric surface, $V_4 T_2^3 G$, whose vertex is $V_4$, is at infinity and the surface is a paraboloid with focus $F_1$, tangent to the reflector along the curve whose projections are $T_2^3 T_4^1$ (Figs. 3 and 4). When the proximate vertex is at $V_7$, the foci are $F_1$ and $F_2^2$, the latter being exterior to the surface, and the quadric surface is a hyperboloid shown in plan as $Q T_7^2 V_7 R$, and is tangent to the reflector along the arc whose projection in plan is $T_7^2 T_4^1$. For the purposes of light projection in a forward direction, only the surface generated by the ellipsoids and paraboloids are necessary. The hyperbolic surface, also, is used when it is desired to direct some of the reflected light to illuminate a portion of the vehicle and the side ground rearwardly. The aperture is then formed by cutting the reflecting surface along its intersection with the surface of a right circular cone, having its vertex on the line $F_2^2 F_1^2$; for example, the reflector might be carried forward on one side, to include the hyperbolic section up to points on the arc shown as $T_7^2 T_4^1$; light emanating from $F_1$ will then be reflected from points on the arc $T_7^2 T_4^1$ rearwardly along divergent radial lines as though emanating from the remote focus of the hyperbola $F_2^2$. It is seen that, of necessity, the other side of the reflector must be cut away to the curve whose projection on plan is $T_2^2 T_4^1$ to permit of the emission of these rays. This construction, of course, involves right-hand and left-hand complementary projectors.

The reflecting surface may also be generated by intersecting the surfaces of a family of quadric surfaces of revolution having a fixed common proximate focus with the surfaces of a family of uniaxial right circular cones, the vertices of said cones coinciding with the remote foci of said quadric surfaces, one element of each cone passing through a fixed point in the plane containing the axis of the cone and the fixed proximate focus of the quadric surfaces, said conical element terminating on the arc of an ellipse whose foci are the fixed proximate focus common to all said quadric surfaces and said fixed point, said terminating point on the said ellipse being a point in common with the surface of said quadric surface of revolution.

In Fig. 3, $F_1$ is the constant proximate focus; $F_2^2 F_1^2$ the axis upon which lie the coincident positions of the foci of quadric surfaces and the vertices of the cones; $F_1^1$ is the fixed point in the plane common to line $F_2^2 F_1^2$ and the proximate common focus $F_1$; and $V_1 O_1 V_6 P_1$ is the ellipse upon which the conical element $F_2^2 T_2^2$ terminates. $F_1^1 T_4^1$ (Fig. 4) is the circular arc which the median vertical plane through $F_1 F_1^2$ forms on intersection with the cone, and its center is $F_1^2$. $T_2^2 T_4^1$ (Figs. 3 and 4) is the intersection of the surface of one position of the cones with the surface of the corresponding quadric, as illustrated; and as said cone and revolving quadric move with their vertices and foci at varying coincident positions on the line $F_2^2 F_1^2$, this moving curve of intersection will generate the reflector.

When the vertex of the cone and the remote focus of the quadric surface of revolution are at $F_1^2$ the intersection is the ellipse $V_1 J_2 V_1^1 K_2$, of which the arc $T_4^2 V_1 T_4^1$ is the element used in the reflecting surface.

When the quadric surface has its axis parallel to the line $F_2^2 F_1^2$ it is a paraboloid of revolution and its curve of contact is its intersection with the cylinder whose parallel elements pass through the circular arc $F_1^1 T_4^1$ and whose axis is $F_2^2 F_1^2$. A portion of this intersection is the curve $T_2^3 T_4^1$.

When the quadric surface has its vertex at $V_7$ and its foci at $F_2^2$ and $F_1$, as shown, it is the hyperboloid of revolution whose trace on the median horizontal plane is the hyperbolic arc $Q T_7^2 V_7 R$, and whose intersection with the cone having the vertex $F_2^2$ and elements passing through the circular arc $F_1^1 T_4^1$, is the curve $T_7^2 T_4^1$.

Since the intersection of a quadric surface of revolution with a right circular cone whose vertex lies at a focus of the quadric surface is a conic section lying in a plane perpendicular to the plane containing the major axis of said quadric surface and said cone, and since the reflector herein described can be generated by the intersection of consecutive quadric surfaces of revolution and right circular cones as hereinbefore described, the respective arcs of intersection are conic sections and lie in planes perpendicular to the median horizontal plane. The planes containing said conic sections pass through the two points common to all said intersecting surfaces, which lie exterior and symmetrical to the median horizontal plane, and the said planes intersect in a common axis which is the line perpendicular to the median horizontal plane through said external points. In my reflector the locus of the proximate vertices of the said conic sections lie on the arc of an ellipse, while the remote vertices lie on the arc of a co-planar hyperbola, one focus and one axis of which is coincident with one focus and one axis of said ellipse. Thus in Fig. 3 the ellipsoid whose projection is $V_2 N_1 V_2^1 M_1$ intersects the right circular cone whose projection is $F_1^1 F_2^2 F_1^3$, in the plane whose projection is the line $T_2^2 T_2^4$. In Fig. 4 the curve of intersection is shown in projection as the ellipse $T_2^2 H T_2^4 I$. The proximate vertex $T_2^2$ of said ellipse lies on the arc of the ellipse $V_1 O_1 V_6 P_1$, Fig. 3, and the remote vertex $T_2^4$ lies on the arc of the hyperbola $V_1^1 T_2^4$. $T_4^1$ and $T_4^2$ (Fig. 4) are the points exterior and symmetrical to the median horizontal plane, shown in projection by the line $F_1 F_1^2$; $T_4^2 T_4^1$ is the vertical line through which the plane of said ellipse $T_2^2 H T_2^4 I$ passes.

In the mechanical construction of this reflector or of dies for the same, I have found that the desired form is obtained when the reflector or die is moved through the path of a cutting tool adapted to the generation of co-planar, co-axial ellipses of varying size, the median vertical plane of the reflector or die being kept in the plane containing the major axis of the generated co-axial ellipses, which plane is perpendicular to the plane in which the generating cutting tool moves, said reflector or die moving transversely and angularly in said perpendicular plane in such manner that one focus of each elliptical arc is a constant distance from a point fixed in relation to the surface of said reflector or die.

While the surface of the reflector may be continuous, as shown by Figs. 1, 2, 3, 4, and 5, it may also be formed of a series of sections of finite width. Fig. 6 shows a side elevation of one form of a reflector having such finite sections, and Fig. 7 is a front elevation of the same. These sections are dihedral portions of a series of consecutive ellipsoids of revolution, said ellipsoids having major axes of constant length but whose minor axes have diminishing lengths, the proximate focus of all ellipsoids being coincident and fixed, the remote foci being within the narrow section and located on the arc of a vertical circle whose center is on the axis of the pencil of planes forming the said dihedral sections of said ellipsoids.

Figs. 6 and 7 show five such sections for the purpose of demonstrating the construction involved. Section number 3 is seen to be a portion of the surface of the ellipsoid of revolution whose major axis is the line $A_3 A_3^1$ and whose proximate and remote foci are respectively $F_1$ and $F_3^1$. The lines $A_1 A_1^1$, $A_2 A_2^1$, .... $A_5 A_5^1$ are the axes of the series of ellipsoids illustrated, from which sections are taken.

The foregoing description shows that a reflector contoured with elliptical arcs lying in a horizontal pencil of planes and having the peculiar mathematical relation of dimensions as herein disclosed will reflect light as specified; also that a reflector, so shaped that vertical planes through a given axis, cut sections which are conic sections having two symmetrically disposed points in common and whose remote foci are disposed along a transverse horizontal line, will likewise reflect light as specified. Either method of construction is theoretically possible, but, due to the limitations of mechanical means, the former method, i. e., diminishing ellipses on a horizontal pencil of planes, is used in the actual construction of reflectors and of dies for forming the same. In such construction, elliptical arcs are cut on the form, each arc being spaced from its adjacent associated members by a small vertical displacement, usually .001 inches, the major and minor axes being changed in sequence to give the required diminution, the centers moving longitudinally and the planes of the ellipses moving vertically to reproduce actually the theoretical figure. The minute marks caused by the cutting tool are then removed with abrasives, to leave the smooth surface required for the reflector. The resulting reflecting form has a profile which, on the median vertical plane, is elliptical rearwardly and hyperbolic forwardly and all sections intersected by the horizontal pencil of planes are ellipses. The forward portion is then removed to provide the light emitting aperture.

In the generation of this reflector, in Figures 1 and 2, I have shown that the portion generated above the median horizontal plane is a hemi-ellipsoid of revolution, whereas in Figs. 3 and 4 I have shown that the portion generated above the median horizontal plane is identical with that portion generated below; and in my claims I cover both such combinations.

While the purpose of the present device is primarily to project light rays, my invention is not to be limited to that use, but is intended to include the projection of other radiant energy, such as heat waves and sound waves, etc.

Having thus described my invention, what I claim as new and desire to secure by Letters Patent is:

1. A reflector for head lights and the like in combination with a light source, which consists of a reflecting surface generated from a series of ellipses, their planes being inclined to one another and including a common horizontal transverse line, the vertices of said ellipses being disposed along the arcs of two conic sections whose planes and foci are coincident, and their proximate focus being situated at the light source and their remote focus being situated on the transverse horizontal line, the remote foci of the generating ellipses being disposed along the arc of a circle lying in the plane of said conic sections coincidentally, the center of the circle being on the transverse horizontal line and a light-emitting aperture at the remote foci of said inclined ellipses.

2. A reflector for headlights and the like in combination with a light source which consists of a reflecting surface generated from a series of ellipses, their planes being inclined to one another and including a common horizontal transverse line, the vertices of said ellipses being disposed along the arcs of two conic sections whose planes and foci are coincident, and their proximate focus being situated at the light source and their remote focus being situated on the transverse horizontal line, the remote foci of the generating ellipses being disposed along a vertical line, lying in the plane of said conic sections coincidentally, and a light-emitting aperture at the remote foci of said inclined ellipses.

3. A reflector for light projectors comprising walls which are elliptical arcs in sections lying in planes converging to a horizontal line, the locus of the remote foci of said elliptical arcs being the arc of a circle.

4. A reflector comprising a surface whose intersections by planes converging to a horizontal line are diminishing elliptical arcs, and whose intersections by a vertical pencil of planes are conic sections, the axis of said pencil of planes passing through a point on the arc of a vertical circle which is the locus of the remote foci of said diminishing elliptical arcs, said point being also the point to which the diminishing elliptical arcs degenerate.

5. A light projector comprising a source of light and a reflector co-operating therewith, said reflector consisting of a combination of ellipsoidal surfaces of revolution having common proximate foci located at the light source and shaped to project the rays of light on planes converging to a remote horizontal transverse line, said rays crossing on a circular arc adjacent to the projector and having the remote transverse line as a central axis.

6. A projecting reflector whose surface is the inner envelope of a family of quadric surfaces of revolution which revolve about their proximate latus rectum as common axis, their remote foci following a transverse line, said quadric surfaces being tangent at all times to a fixed ellipse lying in the plane of revolution of the axes of said quadric surfaces.

7. A projecting reflector, the upper portion of which is a hemi-ellipsoid of revolution, the lower portion being the inner envelope of a family of revolving quadric surfaces of revolution having as axis a vertical line through the proximate foci of said quadric surfaces, the remote foci following a transverse line, said quadric surfaces being tangent to an ellipse on the plane perpendicular to the axes and containing the transverse line.

8. A projecting reflector having a surface generated as the inner envelope of a family of ellipsoids of revolution which rotate about the latus rectum through their proximate foci as an axis, the proximate foci being coincident and fixed, the remote foci lying on a remote horizontal line, said ellipsoids being at all times tangent to an ellipse lying in the plane perpendicular to the axis of rotation and including the remote horizontal line.

9. A reflector whose surface is the inner envelope of the surfaces of a family of conic sections revolving about their longitudinal axes, while rotating about a transverse axis passing through the proximate focus common to all of the conic sections and maintaining their remote foci on a line, said surfaces containing a fixed point exterior to the plane of the line and the fixed focus.

10. A reflector having an upper portion in the form of a hemi-ellipsoid of revolution and a lower portion which is the inner envelope generated by the surfaces of a family of ellipsoids which revolve about a fixed axis, containing the latus rectum through the proximate focus common to all ellipsoids, the remote foci following a transverse line, the ellipsoidal surfaces always containing a fixed point not in the plane of the transverse line and common focus.

11. A projecting reflector whose surface is the locus of arcs of plane conic sections, having a common chord perpendicular to the major axes of said conic sections, the proximate and remote vertices of said conic sections lying respectively upon the arcs of an ellipse and a hyperbola, which are in the plane of the major axes of the conic sections, said elliptical and hyperbolical arcs having one coincident common focus.

12. A reflector whose surface is elliptical in median vertical section and elliptical in sections lying on a horizontal pencil of planes, the proximate vertices of the converging ellipses lying on an elliptical arc, the remote vertices lying on a hyperbolic arc, and the remote foci lying on a circular arc.

13. A reflecting surface which in median vertical section is an elliptical arc whose remote focus lies on the median vertical plane but exterior to the generated surface, and whose surface is generated by revolving an ellipse about a constant major axis while said major axis moves in said median vertical plane, the proximate focus of the first-mentioned elliptical arc and the proximate foci of the revolving ellipses being stationary and coincident, and the remote foci of the revolving ellipses being on a circular arc in the median vertical plane, whose center is the remote focus of the elliptical arc lying on the median vertical plane.

14. A reflector whose surface comprises a combination of elliptical arcs of varying sizes, which direct the emergent rays of its beam in convergent planes, said elliptical arcs having their locus of remote foci lying on an arc in the vertical median longitudinal plane of the reflector.

15. A light reflector having a surface which is the outer envelope of a family of ellipsoids of revolution whose major diameters are of constant length and lie in a median plane, the proximate focus being fixed, the remote foci lying on the arc of a circle whose center is on a remote transverse line, and the forward portion of said envelope being removed to permit the emission of light from a source positioned at the said proximate focus.

16. In a head lamp, a light source and a reflector, said reflector including an upper portion in the form of a hemi-ellipsoid of revolution having its proximate focus positioned at the light source, and a lower portion whose surface is the locus of arcs of a family of vertical plane conic sections having a common chord and remote foci on a distant transverse horizontal line, the proximate focus of the median conic section being positioned at the light source.

17. A reflector for light rays and the like, comprising a surface in the form of elliptical arcs on intersections with planes through a vertical line, said surface being curved laterally inwardly to direct the reflected rays so as to cross on the arc of a vertical circle lying in the median longitudinal plane of the reflector.

18. A reflector comprising a surface and an aperture, said surface having elliptic arc intersections with a horizontal axial pencil of planes and being continuous from a maximum section on the median horizontal plane to a point of degeneration below said plane, said surface being inclined at each and every point thereon to reflect rays from a source within the reflector to remote foci along the axis of said pencil, said rays crossing within the aperture on a circular arc in the median longitudinal vertical plane of the reflector.

19. A reflecting surface formed of a family of diminishing ellipses, said ellipses produced by the intersections of a family of ellipsoids with a pencil of planes, said ellipsoids having a common proximate focus and having remote foci on an arc drawn from a center on the axis of and forward of said surface and said pencil of planes drawn through said center and said remote foci respectively.

20. A reflecting surface consisting of a family of diminishing ellipses whose remote foci lie on an arc drawn from a center on the axis of and forward of said surface and whose rear vertices lie on an elliptic arc.

21. A reflecting surface as set forth in claim 19 wherein the said arc is normal to the said planes.

22. A reflecting surface as set forth in claim 20 wherein the said arc is normal to the said ellipses.

WILLIAM G. WOOD.